UNITED STATES PATENT OFFICE.

GEORGE H. MELLEN, OF ALEXANDRIA, VIRGINIA.

IMPROVED COMPOSITION FOR ELASTIC HAND-STAMP.

Specification forming part of Letters Patent No. 68,770, dated September 10, 1867.

*To all whom it may concern:*

Be it known that I, GEORGE H. MELLEN, of Alexandria, Virginia, have invented, made, and applied to use a new and useful Composition of Several Matters for the Purpose of Making and Casting Elastic Hand-Stamps, from which impressions in printer's and other inks may be taken.

The nature of my invention consists in combining either animal or vegetable glue, glycerine, fixed oil, barytes, chloride of calcium, plumbago, and plaster-of-paris to form a new and useful composition of matter for the above-named purposes.

To enable others and those skilled in the arts to make, use, and cast said composition, I will proceed to describe the same.

The ingredients I employ in the manufacture of my composition for the elastic stamps are as follows, and are used in about the following proportions: glue, (animal or vegetable,) four pounds; glycerine, two pounds; fixed oil, one pound; barytes, one pound; chloride of calcium, four ounces; plumbago, one pound; plaster-of-paris, six ounces. The glue is first soaked for about five hours, and then boiled in a steam-kettle until nearly all the water is evaporated from it. I then add the glycerine, and when the two are thoroughly mixed I add the other ingredients, taking great care to keep the whole well stirred while boiling, which I allow the mixture to do for about thirty minutes.

In casting this composition into elastic stamps or type, I take the molds or matrices, which are made of plaster-of-paris, and after they are thoroughly dried and well oiled take a plate of either soap-stone, iron, or other material, and heat the same to about the temperature of the composition, and then place the mold on said plate. I then pour the composition in its boiling state into the mold, keeping it well stirred during the time that it is being poured into the matrix. In consequence of the heat of the mold from the plate the composition keeps and remains for some time in a fluid state, sufficiently long for the barytes to precipitate or sink to the bottom of the mold, which produces a smooth face to the letter or figure cast, and prevents blow-holes or any other imperfections. The chloride of calcium is introduced to prevent the composition from turning moldy, and renders it quite impervious to any kind of weather. The plumbago and plaster-of-paris are used to give solidity and smoothness to the composition. These stamps can be used for the purpose of printing on glass, porcelain, iron, steel, stone, wood, or paper, and from their peculiar elasticity can be used to print on any surfaces, either circular, corrugated, or irregular.

I do not confine myself to the use of the above-named ingredients in the proportions specified, as, to harden or soften the composition so as to suit different climates or temperatures, I add or diminish the glue, as the case may require.

Having thus described my invention and my method of casting said composition, what I claim, and desire to secure by Letters Patent, is—

1. The combination of the above-named ingredients, to form, when boiled, a new and useful composition of matter for the purposes above specified, substantially as described.

2. The method of casting said composition when boiled, substantially as described.

GEORGE H. MELLEN

Witnesses:
JOHN D. BLOOR,
W. N. WALTON.